(12) United States Patent
Yamamoto et al.

(10) Patent No.: US 11,488,626 B2
(45) Date of Patent: Nov. 1, 2022

(54) DATA STORAGE DEVICE DEMODULATING SERVO STRIPES USING MATCHED FILTER

(71) Applicant: Western Digital Technologies, Inc., San Jose, CA (US)

(72) Inventors: Satoshi Yamamoto, San Jose, CA (US); Derrick E. Burton, Ladera Ranch, CA (US); Masahito Kobayashi, Ibaraki (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/387,609

(22) Filed: Jul. 28, 2021

(65) Prior Publication Data

US 2022/0108722 A1    Apr. 7, 2022

Related U.S. Application Data

(63) Continuation-in-part of application No. 17/176,024, filed on Feb. 15, 2021.
(Continued)

(51) Int. Cl.
*G11B 5/596* (2006.01)
*G11B 21/10* (2006.01)
(Continued)

(52) U.S. Cl.
CPC ...... *G11B 5/59655* (2013.01); *G11B 5/00878* (2013.01); *G11B 5/5928* (2013.01);
(Continued)

(58) Field of Classification Search
CPC .................................................. G11B 5/592
See application file for complete search history.

(56) References Cited

U.S. PATENT DOCUMENTS 6,937,413 B2   8/2005  Bui et al.
6,940,683 B2   9/2005  Berman et al.
(Continued)

FOREIGN PATENT DOCUMENTS

KR      20080089599 A    10/2008

OTHER PUBLICATIONS

International Search Report and the Written Opinion for International Application No. PCT/US2021/038154 dated Oct. 22, 2021, 9 pages.

*Primary Examiner* — K. Wong
(74) *Attorney, Agent, or Firm* — Patterson & Sheridan, LLP; Steven H. VerSteeg

(57) ABSTRACT

A data storage device is disclosed comprising at least one head configured to access a magnetic tape comprising a plurality of servo frames each comprising an A servo burst, a B servo burst, a C servo burst, and a D servo burst. The A servo burst in a first servo frame is read using the head to generate a first read signal which is sampled to generate first signal samples. A first matched filter matched to the A servo burst filters the first signal samples to generate first filtered samples within a first burst window, and the first burst window is updated based on the first filtered samples. The first filtered samples within the first burst window are processed to generate a position error signal (PES), and a position of the head is controlled relative to the magnetic tape based on the PES.

22 Claims, 16 Drawing Sheets

Related U.S. Application Data

(60) Provisional application No. 63/086,153, filed on Oct. 1, 2020.

(51) Int. Cl.
*G11B 5/008* (2006.01)
*G11B 20/12* (2006.01)
*G11B 5/592* (2006.01)

(52) U.S. Cl.
CPC ...... *G11B 5/59688* (2013.01); *G11B 20/1202* (2013.01); *G11B 21/103* (2013.01)

(56) References Cited

U.S. PATENT DOCUMENTS

| | | |
|---|---|---|
| 7,245,450 B1 | 7/2007 | Cherubini et al. |
| 7,369,342 B2 | 5/2008 | Bui et al. |
| 7,480,114 B2 | 1/2009 | Cherubini et al. |
| 7,742,254 B2 | 6/2010 | Cherubini et al. |
| 8,054,568 B2 | 11/2011 | Cherubini et al. |
| 8,054,575 B2 | 11/2011 | Fasen |
| 8,139,312 B2 | 3/2012 | Bui et al. |
| 8,422,162 B2 | 4/2013 | Cherubini et al. |
| 8,760,795 B2 | 6/2014 | Cherubini et al. |
| 9,443,539 B2 | 9/2016 | Cherubini et al. |
| 9,524,741 B1 | 12/2016 | Cherubini et al. |
| 9,564,168 B2 * | 2/2017 | Cherubini ........ G11B 20/10388 |
| 10,026,428 B1 | 7/2018 | Bui et al. |
| 10,199,062 B2 * | 2/2019 | Bui .................. G11B 5/584 |
| 2005/0231845 A1 | 10/2005 | Shirouzu |
| 2007/0097537 A1 | 5/2007 | Hoerger et al. |
| 2008/0100952 A1 | 5/2008 | Trabert et al. |
| 2008/0239559 A1 | 10/2008 | Goker et al. |
| 2010/0079890 A1 | 4/2010 | Brummet |
| 2012/0019948 A1 | 1/2012 | Fasen |
| 2020/0035264 A1 | 1/2020 | Judd et al. |

* cited by examiner

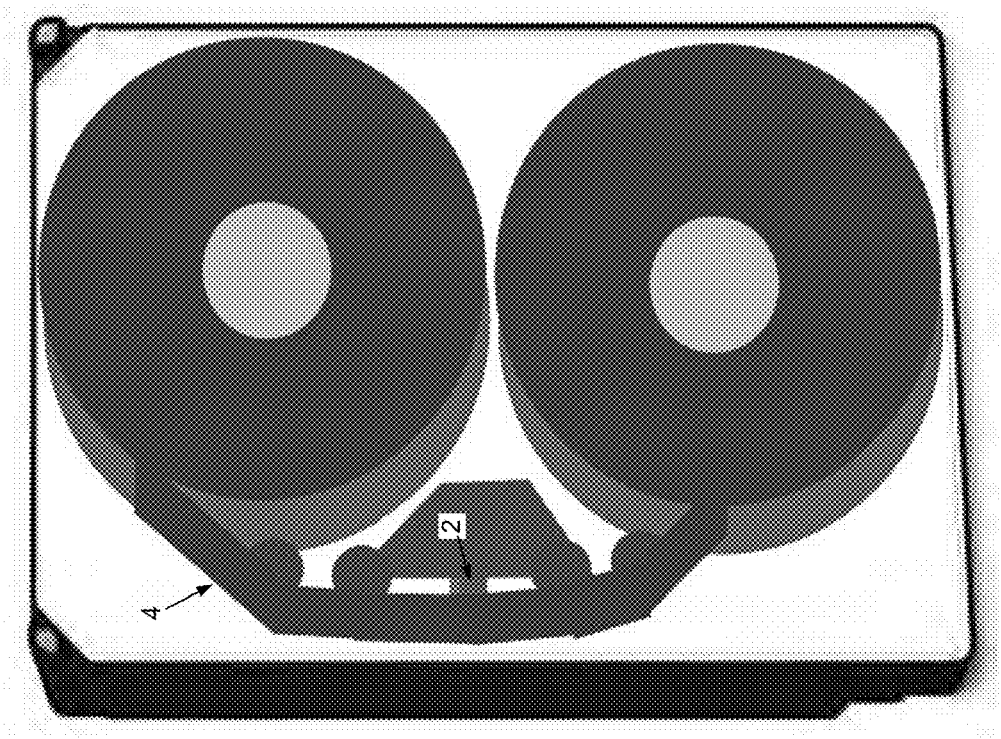
FIG. 1A
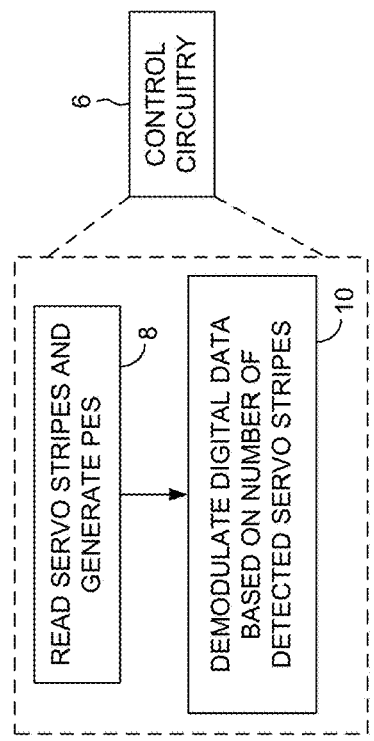
FIG. 1B
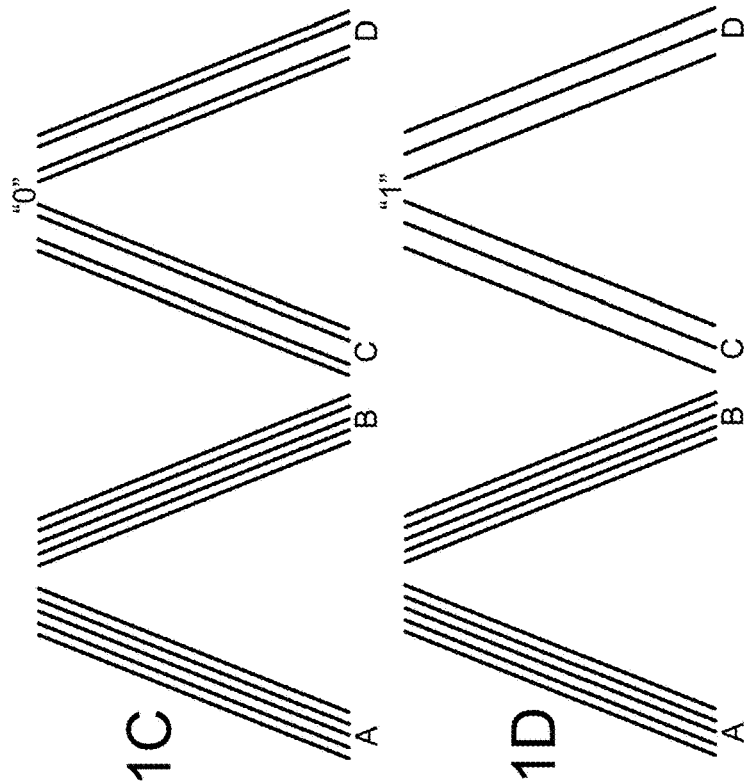
FIG. 1C
FIG. 1D

DATA STORAGE DEVICE DEMODULATING SERVO STRIPES USING MATCHED FILTER

CROSS REFERENCE TO RELATED APPLICATIONS

This application is a continuation in part of U.S. patent application Ser. No. 17/176,024 filed on Feb. 15, 2021, which claims priority to U.S. Provisional Patent Application Ser. No. 63/086,153, filed on Oct. 1, 2020, which are hereby incorporated by reference in their entirety.

BACKGROUND

Conventional tape drive storage systems comprise a magnetic tape wound around a dual reel (reel-to-reel cartridge) or a single reel (endless tape cartridge), wherein the reel(s) are rotated in order to move the magnetic tape over one or more transducer heads during write/read operations. The format of the magnetic tape may be single track or multiple tracks that are defined linearly, diagonally, or arcuate with respect to the longitudinal dimension along the length of the tape. With a linear track format, the heads may remain stationary relative to the longitudinal dimension of the tape, but may be actuated in a lateral dimension across the width of the tape as the tape moves past the heads. With a diagonal or arcuate track format, the heads may be mounted on a rotating drum such that during access operations both the heads and tape are moved relative to one another (typically in opposite directions along the longitudinal dimension of the tape).

BRIEF DESCRIPTION OF THE DRAWINGS

FIG. 1A shows a data storage device according to an embodiment comprising at least one head configured to access a magnetic tape.

FIG. 1B is a flow diagram according to an embodiment wherein digital data is demodulated based on a number of servo stripes in a servo frame.

FIGS. 1C and 1D show a servo frame wherein an A and B servo burst consists of five servo stripes, and a C and D servo burst consists of four servo stripes when representing a digital "0" or three servo stripes when representing a digital "1".

DETAILED DESCRIPTION

Figure 1E:
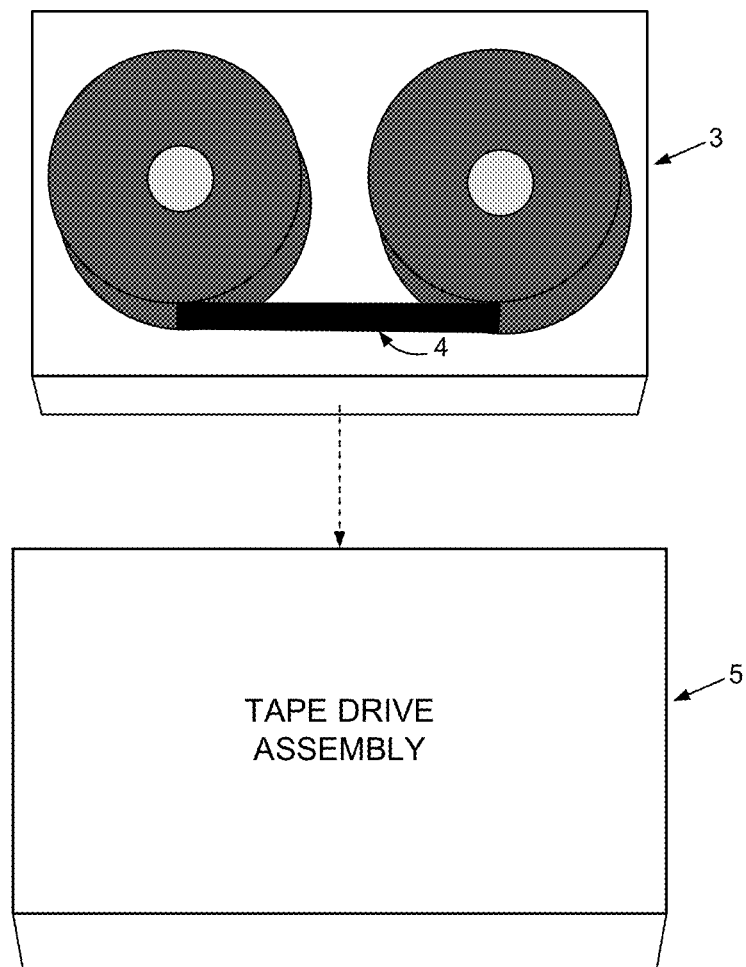
FIG. 1E shows a data storage device comprising a cartridge assembly comprising a magnetic tape, and a tape drive assembly configured to access the magnetic tape.

FIGS. 1A and 1B show a data storage device according to an embodiment comprising at least one head 2 configured to access a magnetic tape 4 comprising a plurality of servo frames each comprising a plurality of servo stripes (e.g., FIG. 1C or 1D). The data storage device further comprises control circuitry 6 configured to execute the flow diagram of FIG. 1B, wherein the servo stripes are read using the head to generate a read signal which is processed to detect a position error signal (PES) used to control a position of the head relative to the magnetic tape (block 8). The read signal is also demodulated into digital data based on a number of servo stripes detected in each servo frame (block 10).

In the embodiment of FIG. 1A, the data storage device comprises an embedded magnetic tape 4 installed into a tape drive assembly which, in one embodiment, may be the same form factor as a conventional disk drive. In another embodiment shown in FIG. 1E, the magnetic tape 4 may be housed in a cartridge assembly 3 that is inserted into (and ejected from) a tape drive assembly 5 similar to a conventional tape drive manufactured under the Linear Tape-Open (LTO) standard. In one embodiment, the tape drive assembly 5 comprises the head 2 configured to access the magnetic tape 4, and the control circuitry 6 configured to execute the flow diagram of FIG. 1B.

FIGS. 1C and 1D show an example servo frame according to an embodiment wherein a first subframe comprises A and B servo bursts each consisting of five servo stripes, and a second subframe comprises C and D servo bursts each consisting of four servo stripes when representing a digital "0" or three servo stripes when representing a digital "1". Any suitable digital data may be encoded into the servo frames, such as a longitudinal position of the head along the length of the magnetic tape. In the example embodiment of FIGS. 1C and 1D, a single bit of the digital data is encoded into each servo frame, whereas in other embodiments described in greater detail below, multiple bits may be encoded into each servo frame. In one embodiment, the differing number of servo stripes between the sub-frames may also be used to distinguish between the subframes. That is, in one embodiment the A and B servo bursts of the first subframe may be considered a "sync" subframe which is distinguished from the second subframe due to having five servo stripes per servo burst as compared to four or three servo stripes per servo burst. Each servo stripe may be written to the magnetic tape in any suitable manner, wherein in one embodiment each servo stripe may be written as an isolated dibit using a suitable write head.

In one embodiment, the PES for controlling the lateral position of the head relative to the width of the magnetic tape is generated based on a ratio of time intervals detected between the servo stripes. For example, a first time interval may be measured between a servo stripe in the A servo burst and a corresponding servo stripe in the B servo burst, and a second time interval may be measured between the servo stripe in the A servo burst and a corresponding servo stripe in the C servo burst. The PES may then be generated as the ratio of the first and second time intervals, wherein the ratio is independent of the speed of the magnetic tape. In one embodiment, multiple time intervals may be measured for multiple of the servo stripes, wherein the resulting ratios may be averaged in order to generate the PES in a manner that attenuates noise that may otherwise obfuscate a single ratio measurement. In another embodiment described below, an average timestamp may be generated for each servo burst and the time intervals measured based on the average timestamps in order to attenuate noise in the PES measurement.

Figure 2A:
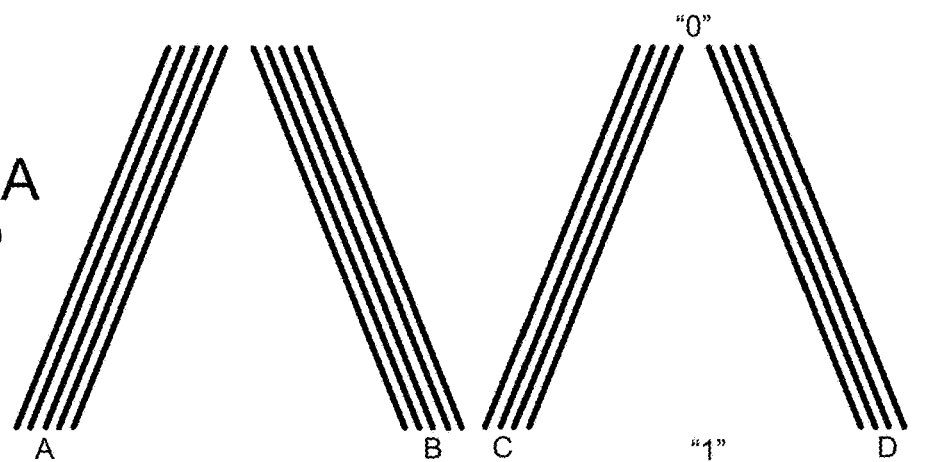
FIGS. 2A and 2B show a prior art servo frame wherein digital data is demodulated from the C and D bursts based on a time shift of the servo stripes.
Figure 2B:
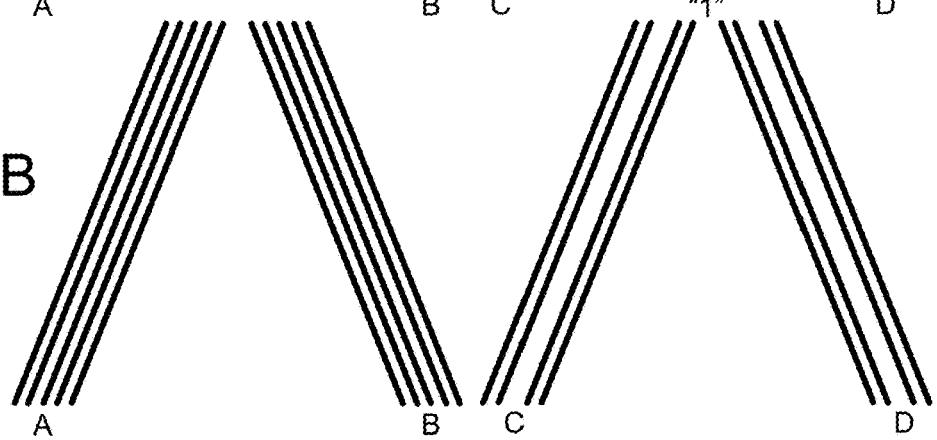

FIGS. 2A and 2B show a prior art format of a {5,4} servo frame meaning the first subframe of A and B servo bursts consist of five servo stripes, and the second subframe of C and D servo bursts consist of four servo stripes. A digital "0" or "1" is encoded into the second subframe based on time shifting the servo stripes. That is, in FIG. 2A a "0" is encoded into the second subframe by recording the servo stripes without a time shift, and in FIG. 2B a "1" is encoded into the second subframe by recording the third and fourth servo stripes with a time shift relative to the first and second servo stripes.

Figure 3A:
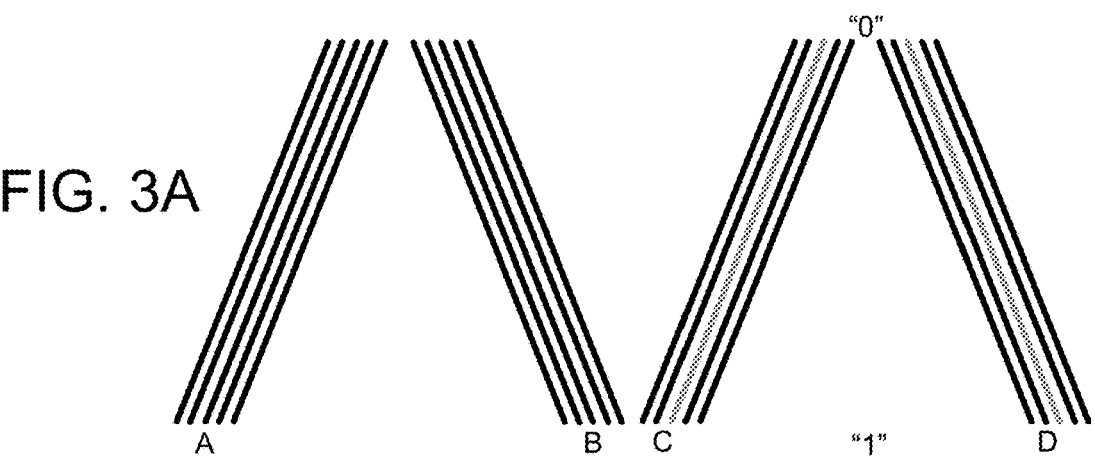
FIGS. 3A and 3B show an embodiment wherein a format of the servo stripes in the A and B servo bursts matches a format of the servo stripes in the C and D servo bursts except for one or two missing servo stripes depending on whether the servo stripes represent a digital "0" or "1".
Figure 3B:
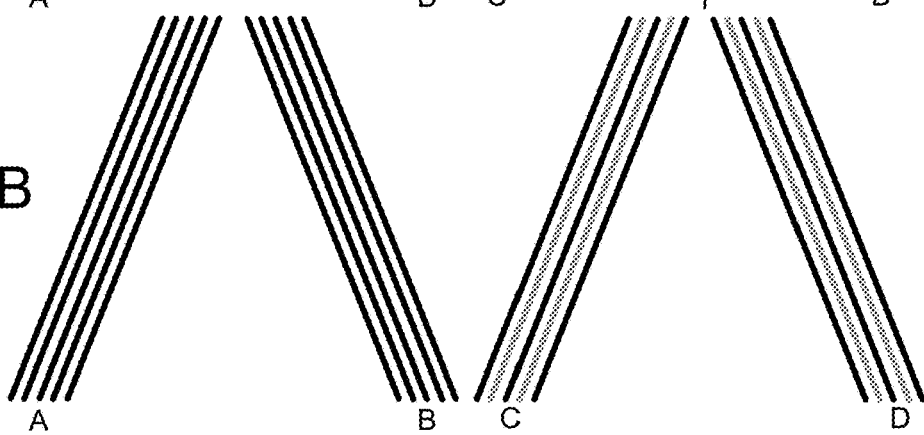

FIGS. 3A and 3B show an embodiment wherein a digital value is encoded by varying the number of servo stripes written to the C and D servo bursts. In FIG. 3A a "0" is encoded by writing a {5,4} servo frame, and in FIG. 3B a "1" is encoded by writing a {5,3} servo frame. In this embodiment, a format of the servo stripes in the first subframe of A and B servo bursts matches a format of the servo stripes in the second subframe of C and D servo bursts except for a single missing servo stripe (the middle servo stripe) when encoding a "0" as shown in FIG. 3A. A format of the servo stripes in the first subframe of A and B servo bursts matches a format of the servo stripes in the second subframe of C and D servo bursts except for two missing servo stripes (the second and fourth servo stripes) when encoding a "1" as shown in FIG. 3B. Accordingly in this embodiment, when measuring the PES time intervals between the servo stripes within a subframe as well as between the subframes the pairing of the servo stripes remains constant. Alternatively when measuring an average timestamp for each servo burst, one or more missing servo strips within a servo burst does not change the average timestamp measurement. Also in this embodiment, the spacing of the servo stripes (including the missing servo stripes) in the first and second subframes remains constant such that the width of the first and second subframes are substantially equal, thereby simplifying the demodulation of the servo frames regardless as to the direction of tape movement (forward or backward).

Figure 4A:
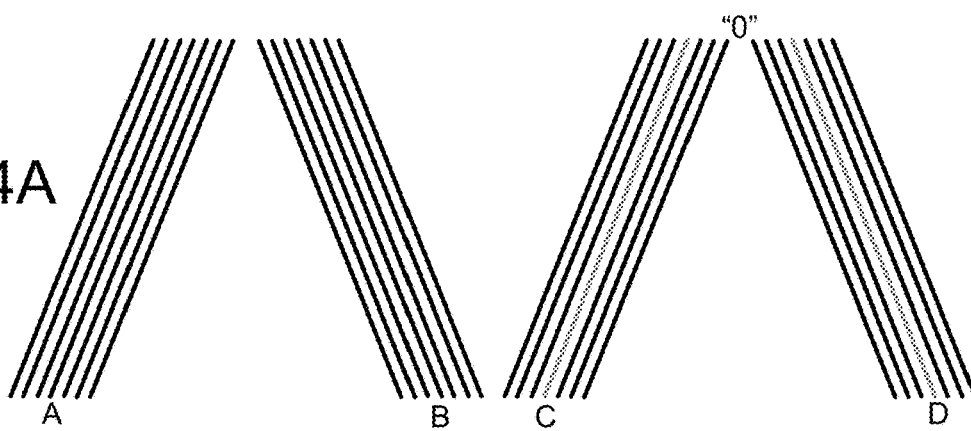
FIGS. 4A-4D show an embodiment wherein the missing servo stripes in the C and D servo bursts represent one of four digital values.
Figure 4B:
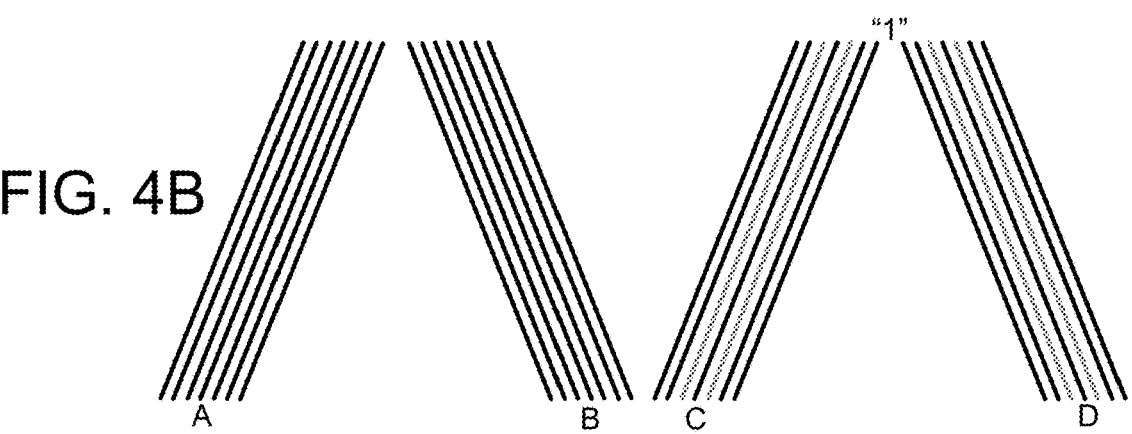
Figure 4C:
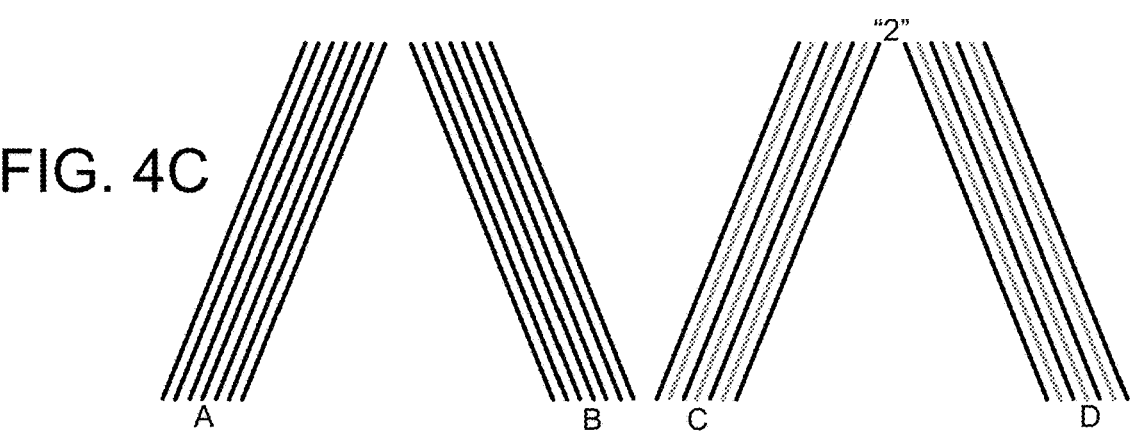
Figure 4D:
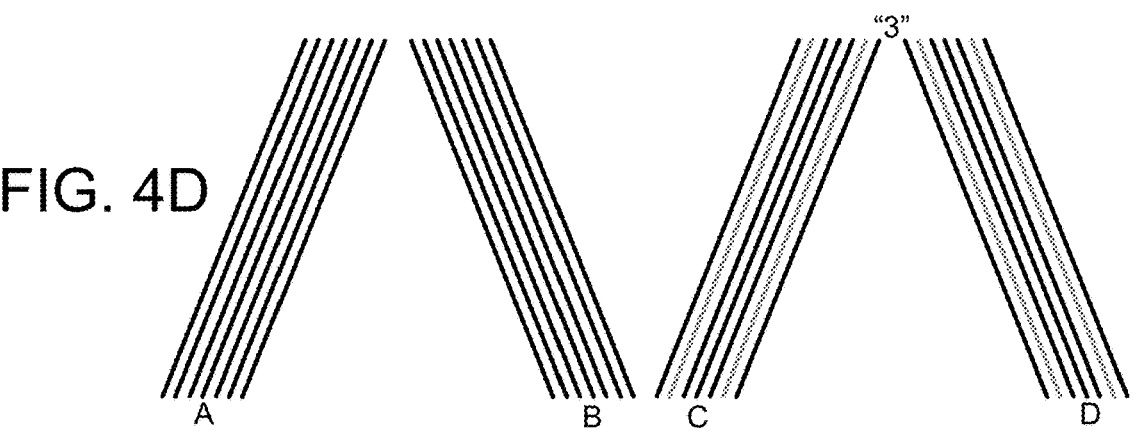
Figure 5A:
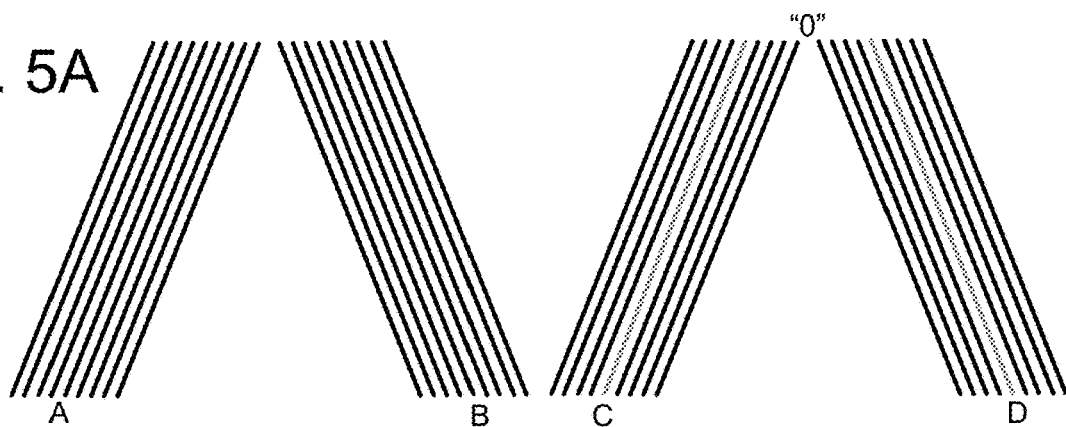
FIGS. 5A-5H show an embodiment wherein the missing servo stripes in the C and D servo bursts represent one of eight digital values.
Figure 5B:
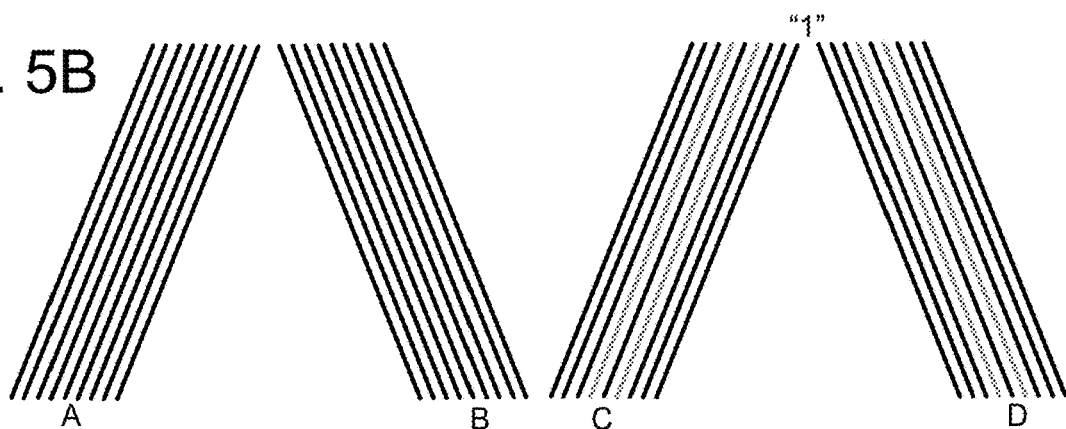
Figure 5C:
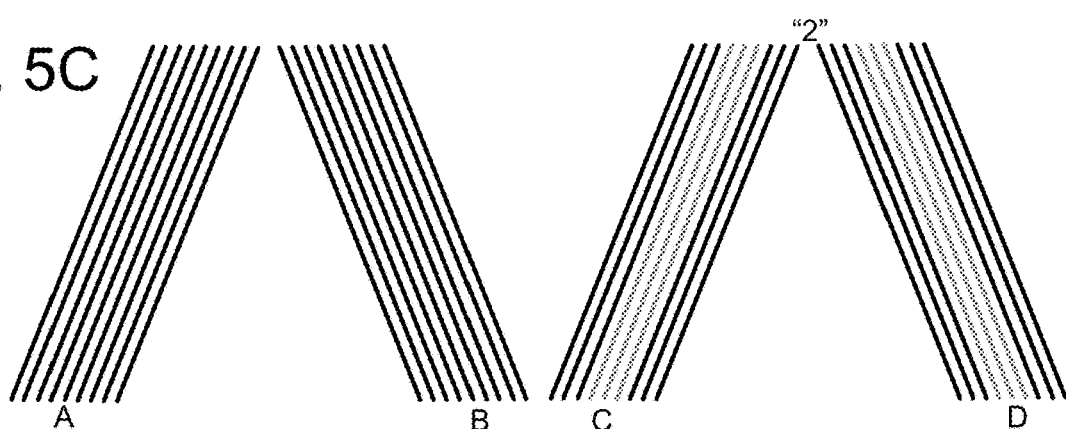
Figure 5D:
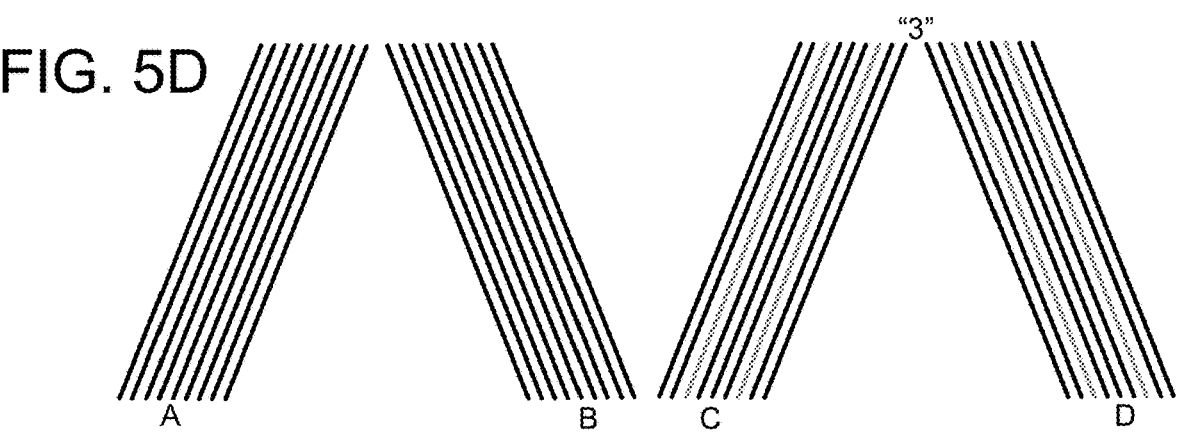
Figure 5E:
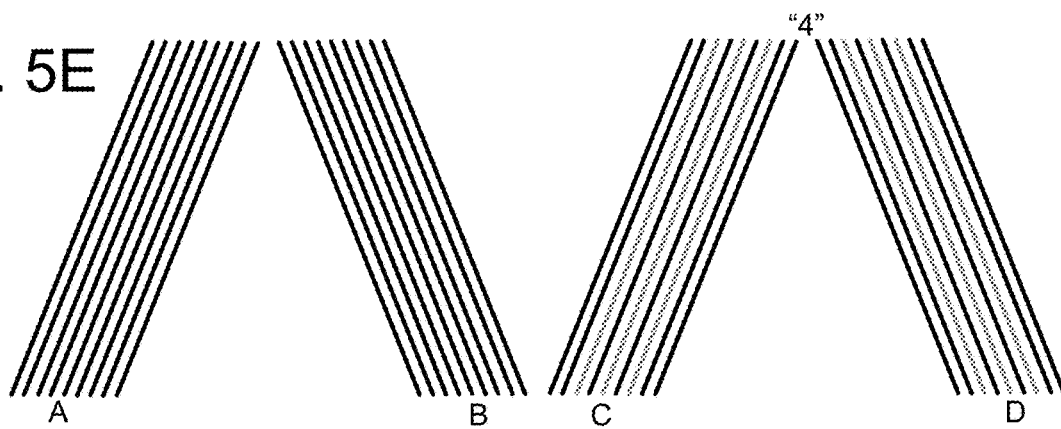
Figure 5F:
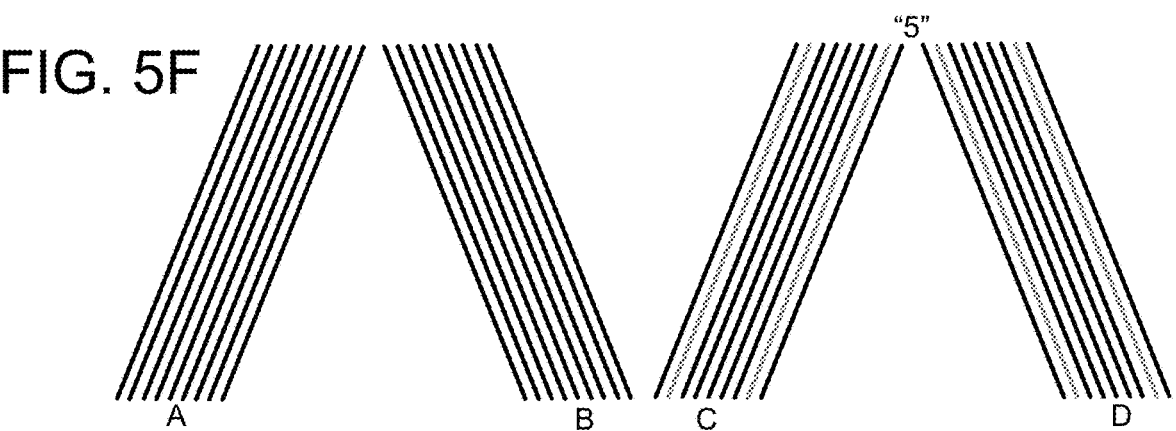
Figure 5G:
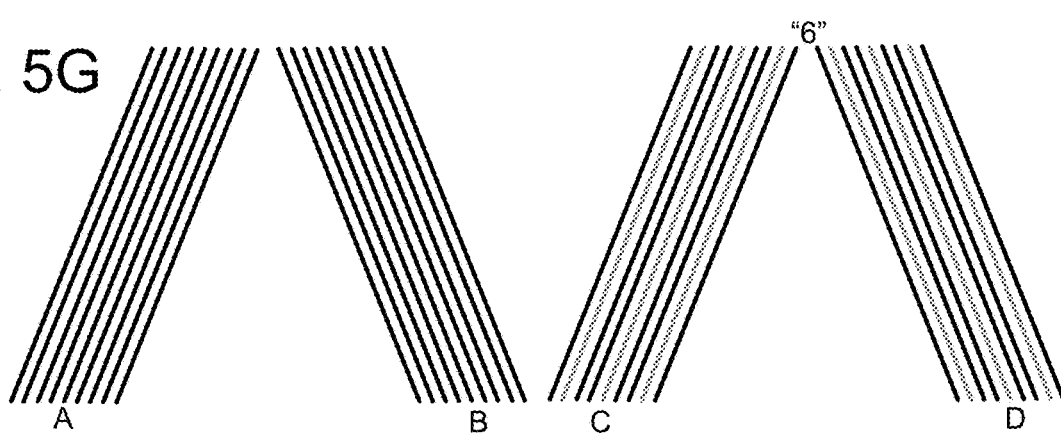
Figure 5H:
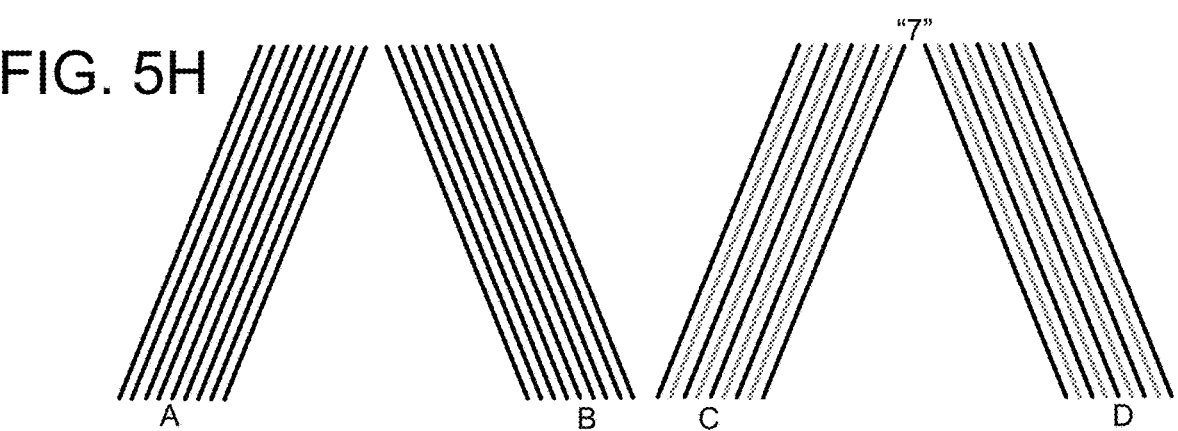

FIGS. 4A-4D show an embodiment wherein the second subframe encodes one of four digital values (i.e., the second subframe encodes two bits of data). In FIG. 4A a "0" is encoded by writing a {7,6} servo frame with the fourth servo stripe missing in the second subframe. In FIG. 4B a "1" is encoded by writing a {7,5} servo frame with the third and fifth servo stripe missing in the second subframe. In FIG. 4C a "2" is encoded by writing a {7,4} servo frame with the second, fourth, and sixth servo stripes missing in the second subframe. In FIG. 4D a "3" is encoded by writing a {7,5} servo frame with the second and sixth servo stripes missing from the second subframe.

FIGS. 5A-5H show an embodiment wherein the second subframe encodes one of eight digital values (i.e., the second subframe encodes three bits of data) by writing various permutations of a {9,N} servo frame. That is, nine servo stripes are written in the first subframe, and N=8, 7, 6 or 5 servo stripes are written in the second subframe depending on the digital value encoded into the second subframe as shown in FIGS. 5A-5H.

Figure 6A:
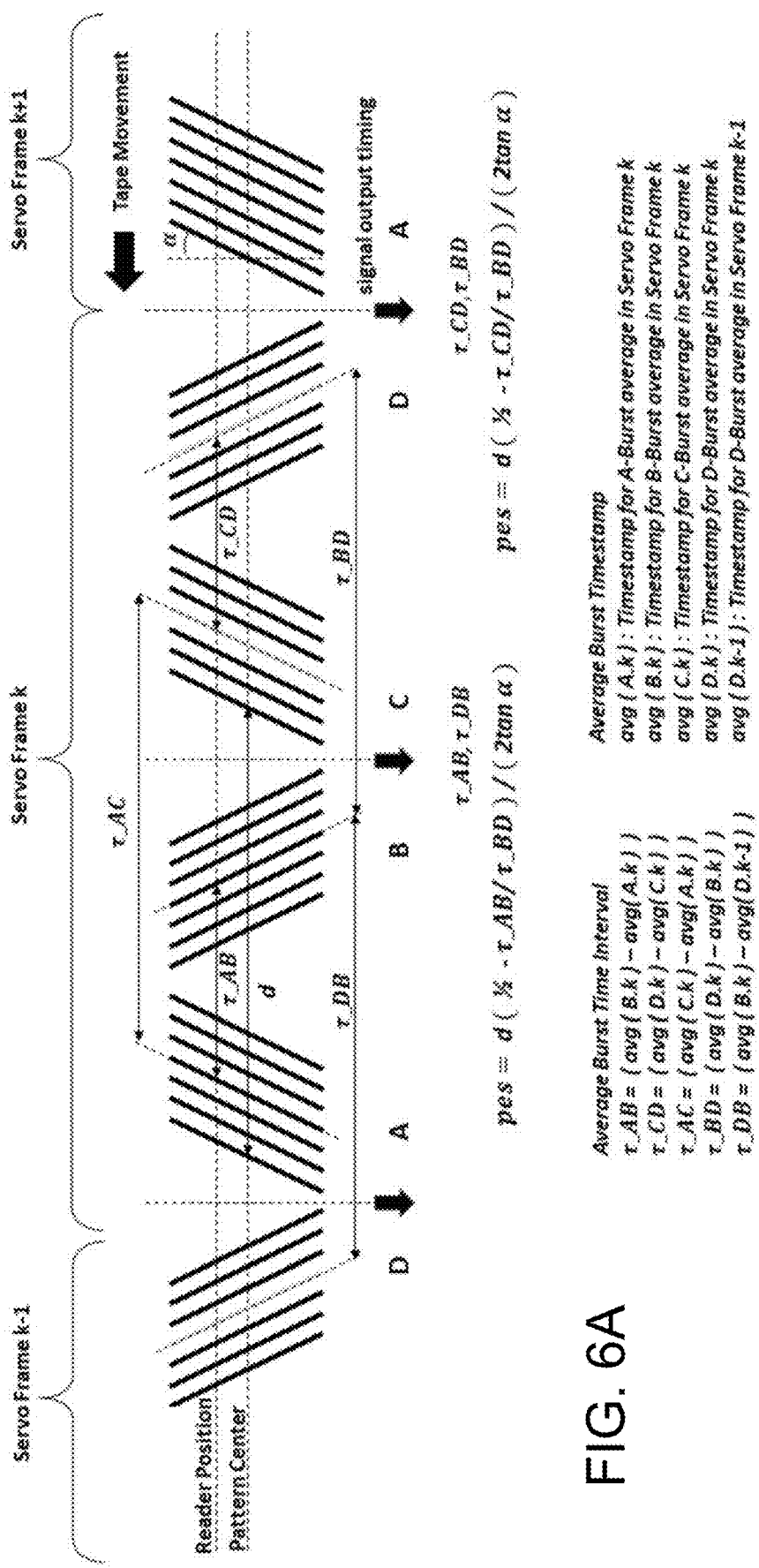
FIGS. 6A and 6B show an embodiment wherein a position error signal (PES) is generated at a rate of two measurements per servo frame.
Figure 6B:
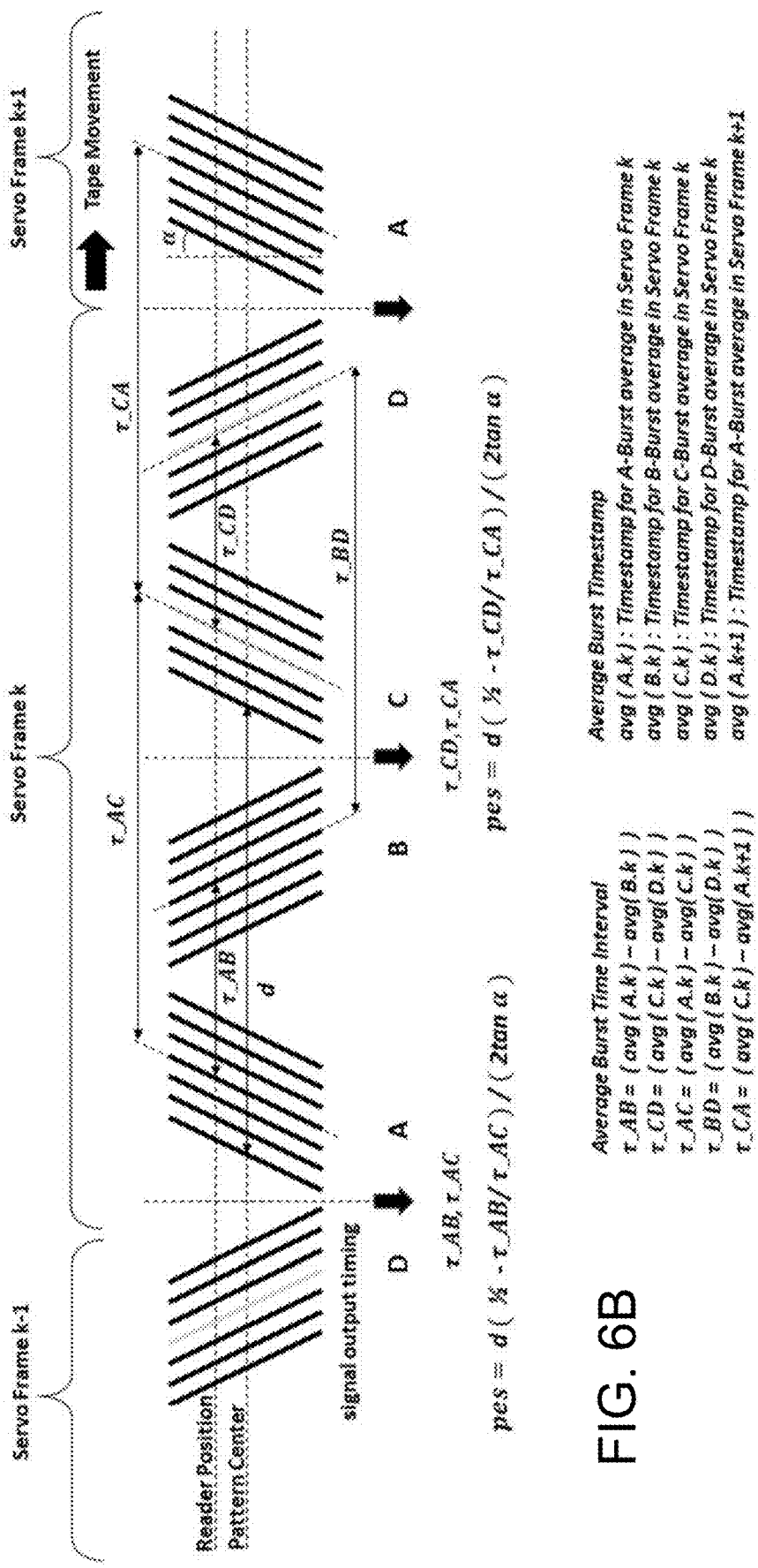
Figure 7A:
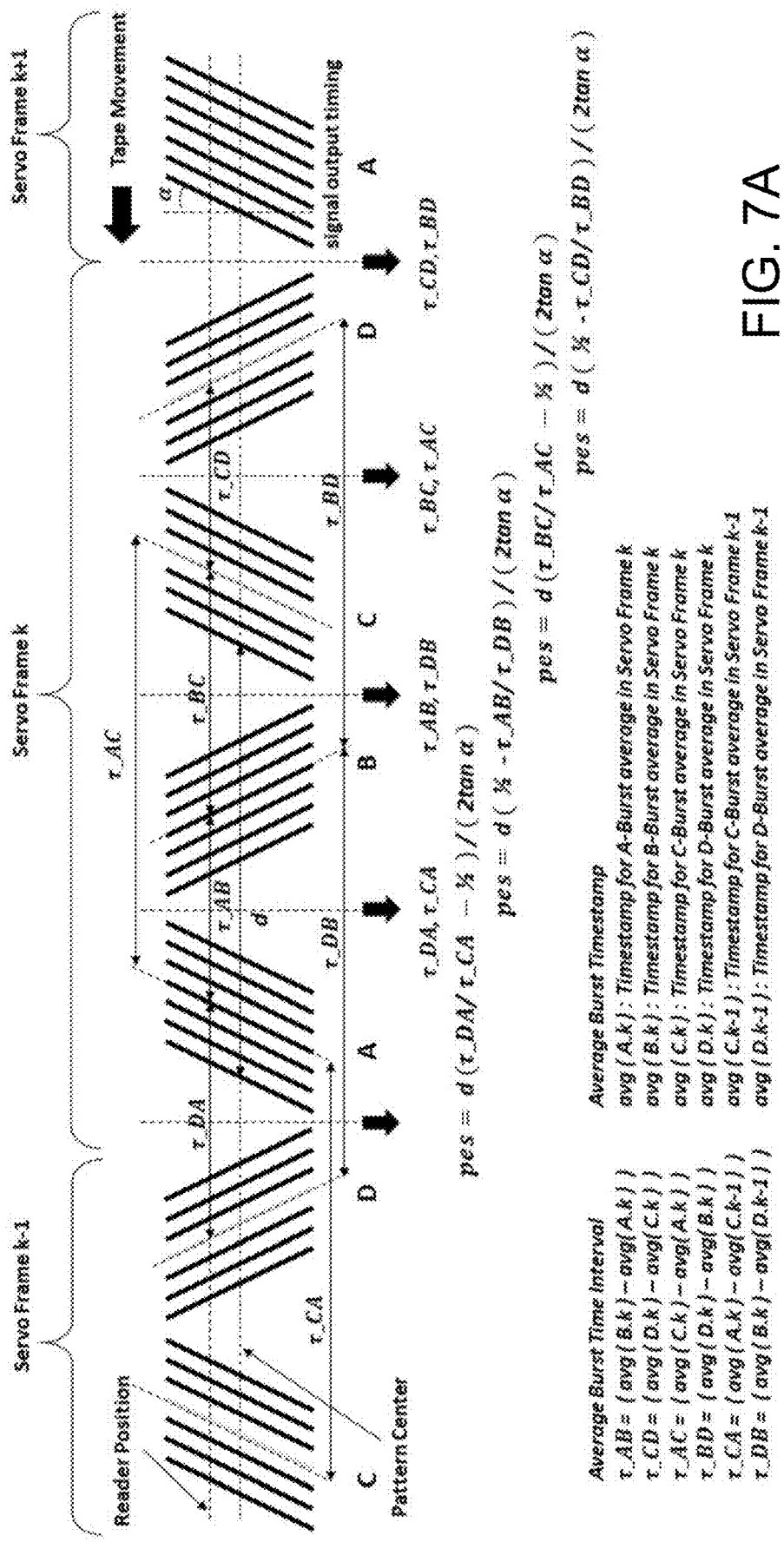
FIGS. 7A and 7B show an embodiment wherein a position error signal (PES) is generated at a rate of four measurements per servo frame.
Figure 7B:
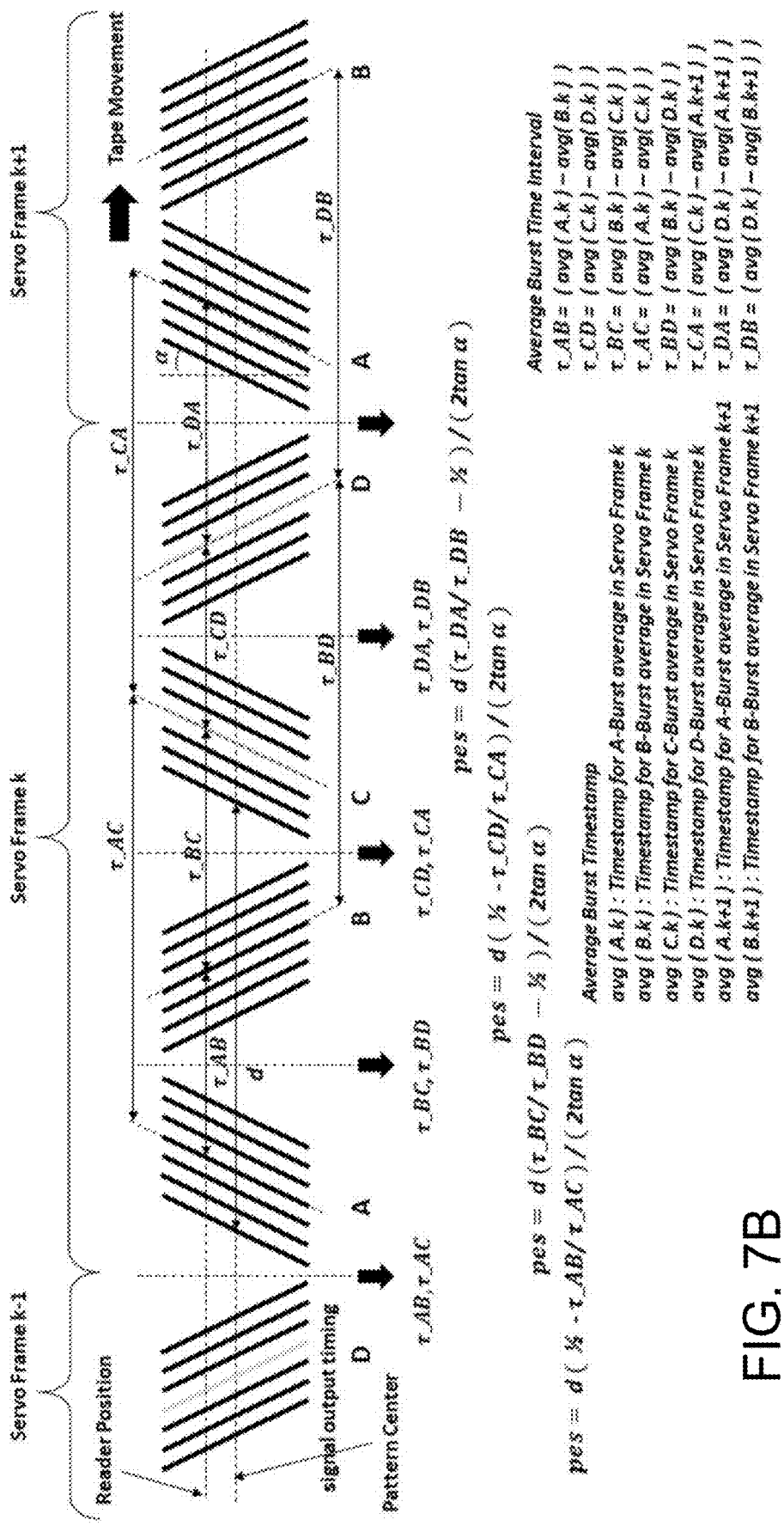

FIGS. 6A and 6B show an embodiment wherein a PES for controlling the lateral position of the head is generated at a rate of two measurements per servo frame. In this embodiment, an average timestamp generated for each servo burst is used to measure an average time interval between the servo bursts. The PES is then generated based on the ratio of selected intervals as shown in FIGS. 6A and 6B in a manner that is independent of tape speed. FIGS. 7A and 7B show a similar embodiment wherein a PES for controlling the lateral position of the head is generated at a rate of four measurements per servo frame.

Figure 8A:
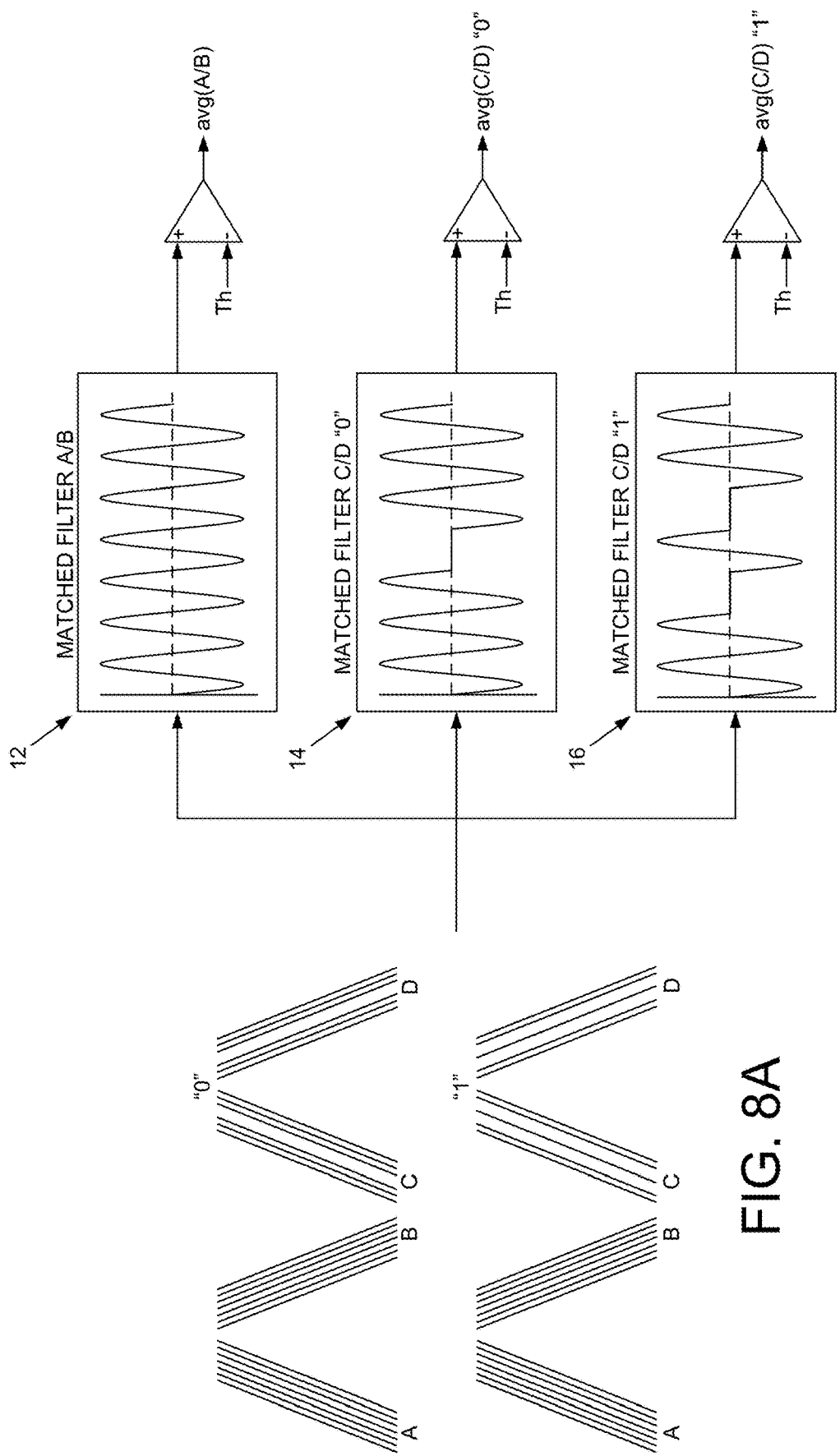
FIGS. 8A and 8B show embodiments wherein a plurality of matched filters measure an average timestamp for each servo burst.

FIG. 8A shows an embodiment wherein a plurality of matched filters each matched to the servo stripes of a servo burst generates the average timestamp in order to generate the PES in the embodiments described above. In addition, the output of the matched filters matched to the C/D servo bursts are also used to demodulate the digital value(s) encoded into the C/D servo bursts. In the example of FIG. 8A, the servo frame format is {7,6} when encoding a digital "0" value or {7,5} when encoding a digital "1" value. A first matched filter 12 correlates the read signal with an expected series of pulses matching the servo stripes of the NB bursts, a second matched filter 14 correlates the read signal with an expected series of pulses matching the servo stripes of the C/D bursts encoding a "0" digital value, and a third matched filter 16 correlates the read signal with an expected series of pulses matching the servo stripes of the C/D bursts encoding a "1" digital value. In the embodiment of FIG. 8A, the output of each matched filter is compared to a threshold, and the time at which the output exceeds the threshold becomes the average timestamp for the corresponding servo burst. That is, the output of the matched filter that matches the servo burst being read will exceed the threshold due to the correlation exceeding the threshold. In addition, when the output of the matched filter matched to the C/D servo burst exceeds the threshold, the corresponding digital value is also demodulated as shown in FIG. 8A.

Figure 8B:
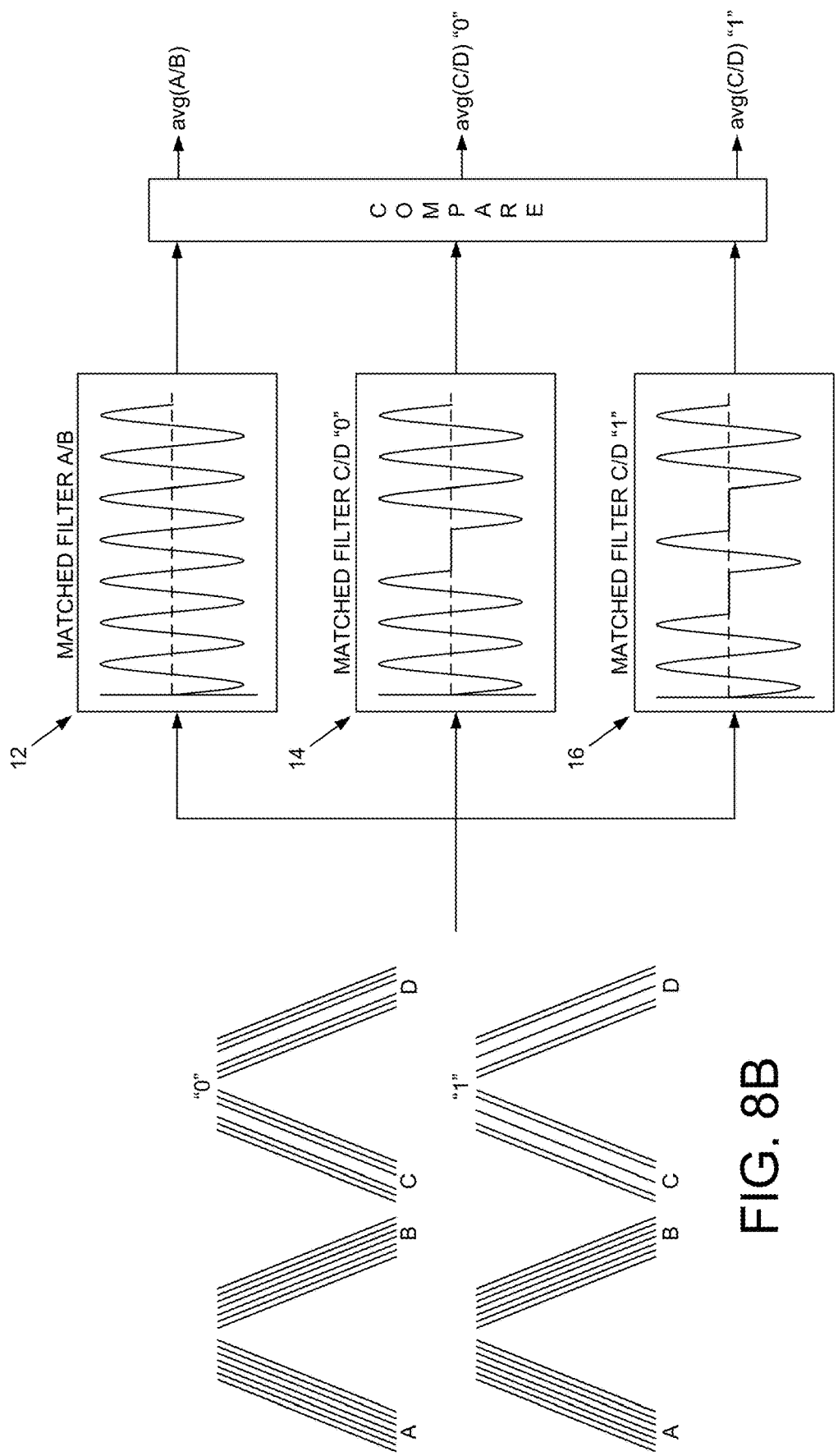

FIG. 8B shows an embodiment wherein the outputs of the matched filters are compared to one another to facilitate generating the timestamps and demodulating the digital values. For example, in one embodiment a timestamp is generated (and a digital value demodulated) when the outputs of each matched filter exceeds a gating threshold indicating the pulses in the read signal align with each of the matched filters (i.e., the correlations reach a maximum). At this point, the matched filter having the highest output (highest correlation) corresponds to the servo burst being read and is therefore used to generate the timestamp as well as demodulate the digital value.

In the embodiment of FIGS. 8A and 8B, the matched filters are shown as operating in continuous time meaning the analog read signal is correlated with an analog filter having a continuous time impulse response substantially matched to the pulses generated by reading the servo stripes in each servo burst. In another embodiment, the matched filters may operate in discrete time meaning the analog signal is sampled, and the signal samples filtered with a digital filter having a discrete time impulse response substantially matched to the signal samples of the pulses generated by reading the servo stripes in each servo burst.

Figure 9A:
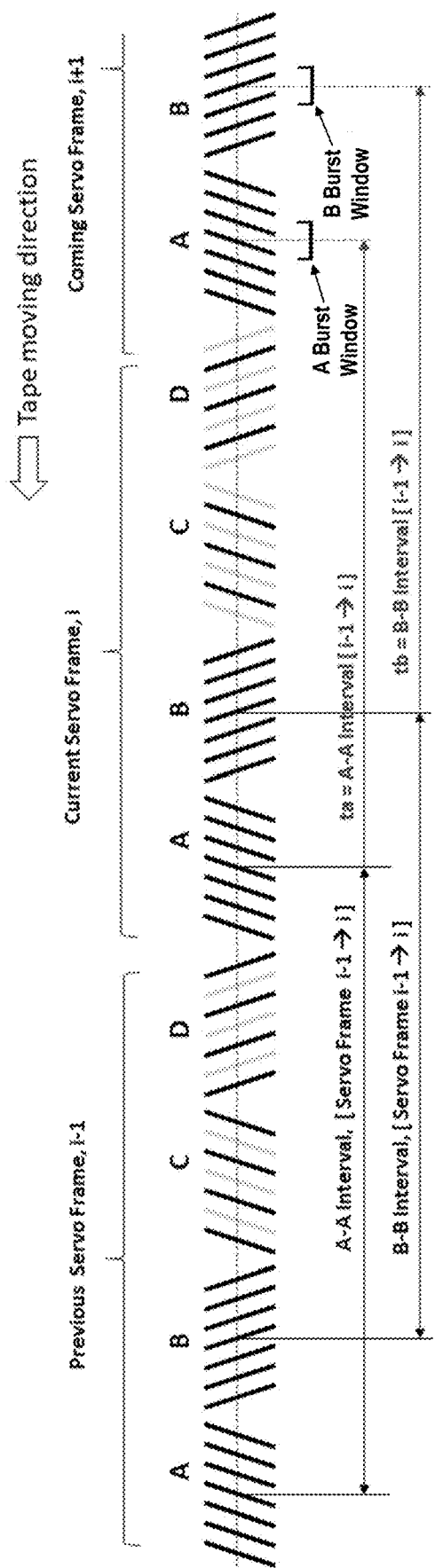
FIG. 9A shows an embodiment wherein the output of an A/B matched filter is processed during a burst window that estimates a center of a corresponding A/B servo burst.

FIG. 9A shows an embodiment wherein the control circuitry 6 is configured to read the A servo burst in a first servo frame using the head to generate a first read signal, sample the first read signal to generate first signal samples, use a first matched filter matched to the A servo burst to generate first filtered samples in response to the first signal samples within a first burst window, first update the first burst window based on the first filtered samples, process the first filtered samples to generate a position error signal (PES), and control a position of the head relative to the magnetic tape based on the PES.

In the embodiment of FIG. 9A, an A burst window and a B burst window are opened during an interval that estimates a center of the corresponding servo bursts so that the output of the NB matched filter 12 of FIG. 8A is evaluated during the NB burst window, thereby improving the accuracy of the corresponding average timestamp. For example, in one embodiment the output of the matched filter may be a periodic signal comprising multiple pulses with a center pulse representing the center of the servo burst. Evaluating the matched filter output during the burst window helps ensure the center pulse is the pulse that is detected (e.g., using peak detection) as opposed to mis-detecting a neighboring pulse. In the embodiment of FIG. 9A, an estimated time ta to the center of the next A servo burst is computed as the measured A-A burst interval from the previous servo frame (i-1) to the current servo frame (i). A corresponding A burst window is then generated using any suitable plus/minus delta from the estimated time ta as shown in FIG. 9A. A similar B burst window is generated by computing an estimated time tb based on the measured B-B burst interval from the previous servo frame (i-1) to the current servo frame (i) as shown in FIG. 9A. Each time the average timestamp is generated for the A servo burst or B servo burst, the corresponding A and B servo burst window for the next servo frame is updated.

Figure 9B:
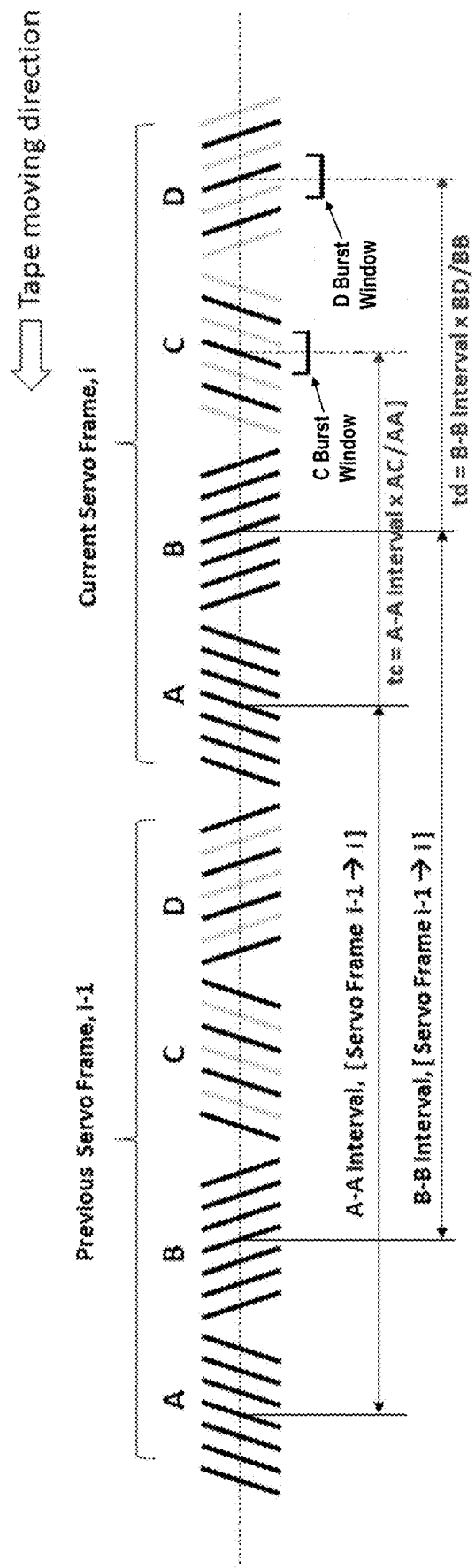
FIG. 9B shows an embodiment wherein the output of a C/D matched filter is processed during a burst window that estimates a center of a corresponding C/D servo burst.

FIG. 9B shows an embodiment wherein a C burst window is generated for the C servo burst and a D burst window is generated for the D servo burst. In this embodiment, the estimated time tc to the center of the next C servo burst is generated as a fraction of the measured A-A burst interval from the previous servo frame (i-1) to the current servo frame (i), wherein in this embodiment the predetermined fraction is the fraction of the A-A burst interval that is the A-C burst interval (AC/AA). Similarly in the embodiment of FIG. 9B, the estimated time td to the center of the next D servo burst is generated as a fraction of the measured B-B burst interval from the previous servo frame (i-1) to the current servo frame (i), wherein in this embodiment the predetermined fraction is the fraction of the B-B burst interval that is the B-D burst interval (BD/BB). Each time the average timestamp is generated for the A servo burst or B servo burst, the corresponding C and D servo burst window for the next servo frame is updated.

Figure 10A:
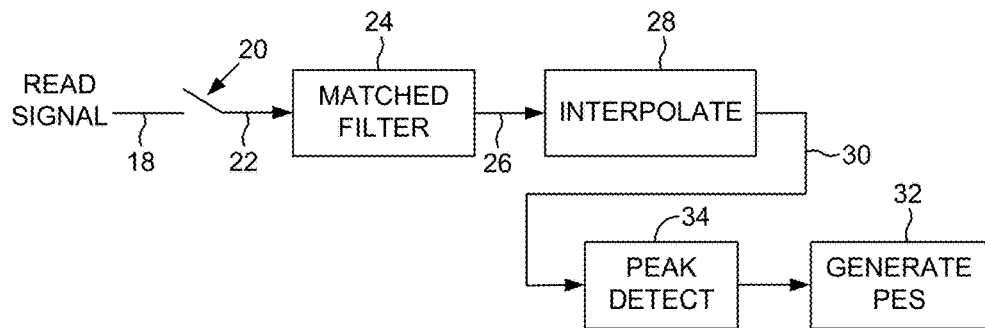
FIG. 10A shows an embodiment wherein the output of the matched filter is interpolated to increase the accuracy of the PES.

FIG. 10A shows an embodiment wherein the control circuitry 6 is configured to read a first servo burst using the head to generate a read signal 18 which is sampled 20 to generate signal samples 22. A first matched filter 24 matched to the first servo burst is used to filter the signal samples 22 to generate filtered samples 26. At least part of the filtered samples 26 are interpolated 28 to generate interpolated samples 30, and the interpolated samples 30 are processed 32 to generate a position error signal (PES) for controlling a position of the head relative to the magnetic tape based on the PES.

In one embodiment, the output of the matched filter 24 represented by the interpolated samples 30 may be a periodic signal comprising multiple pulses with a center pulse representing the center of the corresponding servo burst. In the embodiment of FIG. 10A, the control circuitry 6 comprises a suitable peak detector 34 for detecting the peak of the center pulse which represents the average timestamp of the servo burst for use in generating the PES as described above.

Figure 10B:
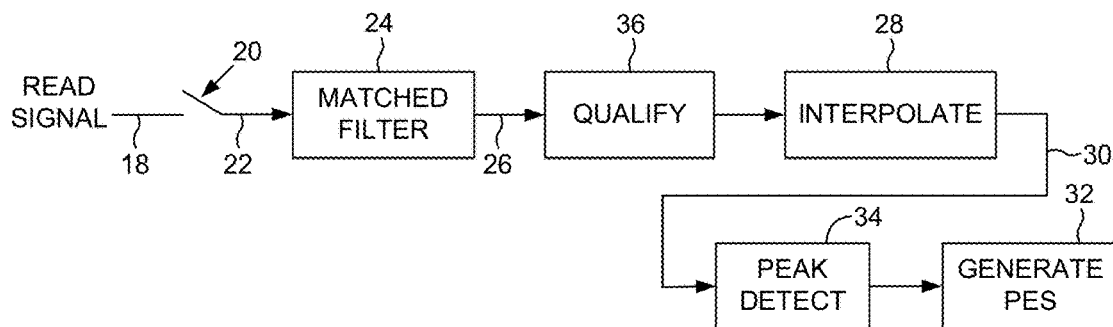
FIG. 10B shows an embodiment wherein the output of the matched filter is qualified before being interpolated.
Figure 10C:
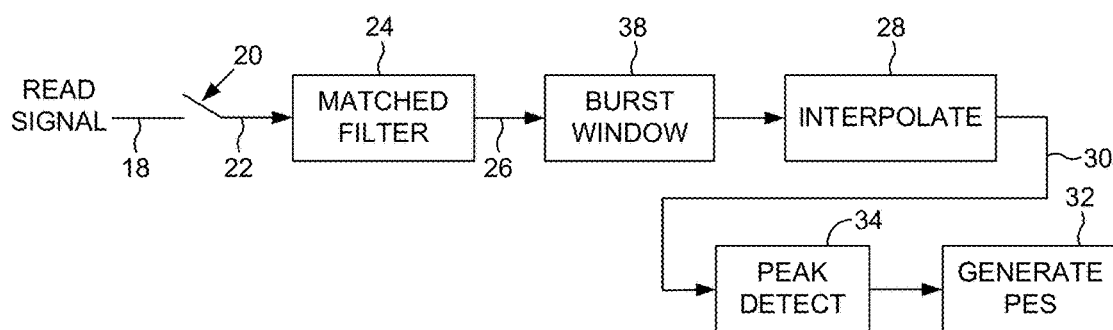
FIG. 10C shows an embodiment wherein the qualifying criteria prior to the interpolation comprises a burst window that estimates a center of a servo burst.
Figure 10D:
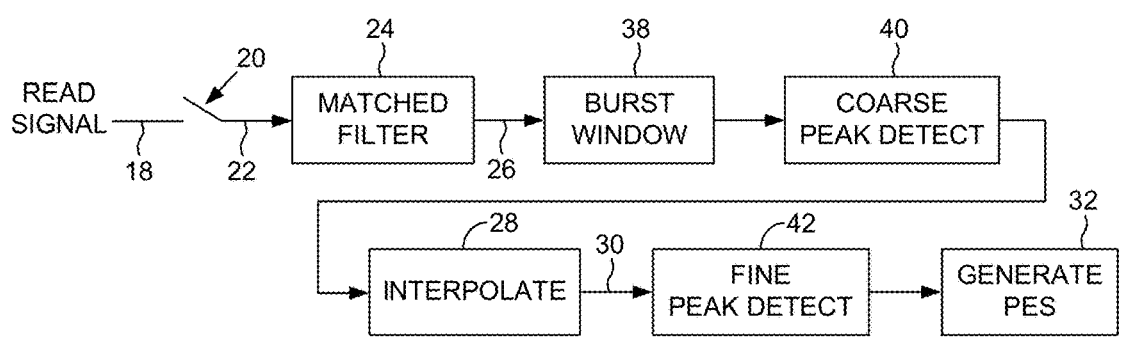
FIG. 10D shows an embodiment wherein the qualifying criteria prior to the interpolation comprises a burst window followed by a coarse peak detector.

FIG. 10B shows an embodiment wherein the filtered samples 26 are qualified 36 based on a suitable qualifying criteria in order to select a subset of the filtered samples 26 for further processing by the interpolator 28. For example, in one embodiment the qualifying criteria may comprise the filtered samples 26 exceeding a predetermined threshold to ensure the amplitude of the filtered samples 26 is above a noise floor. In an embodiment shown in FIG. 10C, the qualifying criteria comprises a burst window 38 that gates the output of the matched filter 24 as described above with reference to FIGS. 9A and 9B, so that the interpolator 28 operates on the filtered samples 26 that represent the center pulse as described above. FIG. 10D shows an embodiment wherein the qualifying criteria further comprises a coarse peak detector 40 for detecting a coarse peak within the burst window 38, wherein the subset of filtered samples 26 proximate the detected coarse peak are selected for interpolation 28. A fine peak detector 42 then processes the interpolated samples 30 to detect a more accurate peak in the pulse representing the center of the servo burst.

Figure 11:
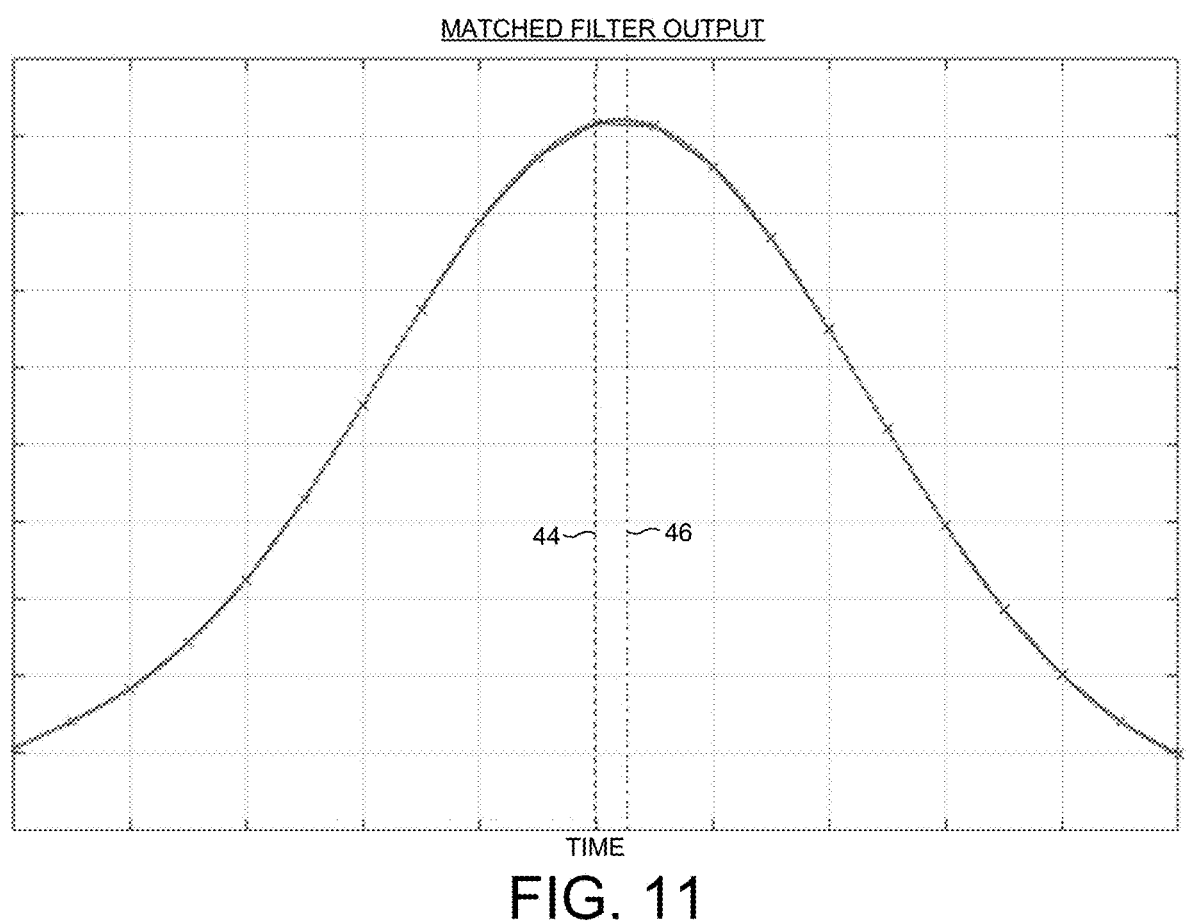
FIG. 11 shows an example wherein interpolating the output of the matched filter increases the accuracy of the average timestamp for generating the PES.

FIG. 11 shows an example of the output of the matched filter 24 such as shown in FIG. 10A and a corresponding average timestamp 44 generated when the filtered samples 26 are not interpolated (up-sampled) by the interpolator 28, and an average timestamp 46 when the filtered samples 26 are interpolated (up-sampled) by a factor of ten. This example illustrated how the interpolation improves the accuracy of the average timestamp representing the center of the corresponding burst pulse.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In addition, any suitable electronic device, such as computing devices, data server devices, media content storage devices, etc. may comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device configured to access a magnetic media comprising a plurality of servo frames each comprising an A servo burst, a B servo burst, a C servo burst, and a D servo burst, the data storage device comprising:
   at least one head configured to access the magnetic media; and
   control circuitry configured to:
      read the A servo burst in a first servo frame using the head to generate a first read signal;
      sample the first read signal to generate first signal samples;
      use a first matched filter matched to the A servo burst to filter the first signal samples to generate first filtered samples within a first burst window;
      first update the first burst window based on the first filtered samples;
      process the first filtered samples within the first burst window to generate a position error signal (PES); and
      control a position of the head relative to the magnetic media based on the PES.

2. The data storage device as recited in claim 1, wherein each servo burst comprises a plurality of servo stripes.

3. The data storage device as recited in claim 1, wherein the data storage device further comprises the magnetic media, and the magnetic media includes magnetic tape.

4. The data storage device as recited in claim 1, wherein:
   the magnetic media is housed in a cartridge assembly; and
   the data storage device further comprises a tape drive assembly configured to receive the cartridge assembly.

5. The data storage device as recited in claim 1, wherein the first burst window estimates a center of the A servo burst in the first servo frame, and the control circuitry is further configured to:
   read the A servo burst in a second servo frame using the head to generate a second read signal;
   sample the second read signal to generate second signal samples;
   use the first matched filter matched to the A servo burst to filter the second signal samples to generate second filtered samples within the first updated first burst window; and
   second update the first burst window based on the second filtered samples.

6. The data storage device as recited in claim 5, wherein the control circuitry is further configured to:
   measure an A-A burst interval representing an estimated time ta from the center of the A servo burst in the first servo frame to a center of the A servo burst in the second servo frame; and
   second update the first burst window based on the estimated time ta.

7. The data storage device as recited in claim 6, wherein the control circuitry is further configured to:
   generate a second burst window based on the estimated time ta;
   read the C servo burst in the first servo frame using the head to generate a third read signal;
   sample the third read signal to generate third signal samples;
   use a second matched filter matched to the C servo burst to filter the third signal samples to generate third filtered samples within the second burst window; and
   process the third filtered samples to generate the PES.

8. The data storage device as recited in claim 7, wherein the control circuitry is further configured to generate the second burst window based on a predetermined fraction of the estimated time ta.

9. The data storage device of claim 7, wherein:
   the control circuitry is configured to read a second servo burst using the head, wherein the A servo burst and the B servo burst are part of a first subframe, and the C servo burst and the D servo burst are part of a second subframe;
   at least one of the A servo burst, the B servo burst, the C servo burst, or the D servo burst has a missing or unreadable servo stripe; and
   the first subframe has a first width and the second subframe has a second width equal to the first width.

10. A data storage device configured to access a magnetic media comprising a plurality of servo frames each comprising an A servo burst, a B servo burst, a C servo burst, and a D servo burst, the data storage device comprising:

at least one head configured to access the magnetic media; and control circuitry configured to:
- measure an estimated time ta from a center of the A servo burst in a first servo frame to a center of the A servo burst in a second servo frame;
- generate an A burst window for the A servo burst in a third servo frame based on the estimated time ta;
- read the A servo burst in a third servo frame using the head to generate a first read signal;
- sample the first read signal to generate first signal samples;
- use a first matched filter matched to the A servo burst to filter the first signal samples to generate first filtered samples within the A burst window;
- process the first filtered samples to generate a position error signal (PES); and
- control a position of the head relative to the magnetic media based on the PES.

11. The data storage device as recited in claim 10, wherein each servo burst comprises a plurality of servo stripes.

12. The data storage device as recited in claim 10, wherein the data storage device further comprises the magnetic media, and the magnetic media includes magnetic tape.

13. The data storage device as recited in claim 10, wherein:
- the magnetic media is housed in a cartridge assembly; and
- the data storage device further comprises a tape drive assembly configured to receive the cartridge assembly.

14. The data storage device as recited in claim 10, wherein the control circuitry is further configured to:
- generate a C burst window based on the estimated time ta;
- read the C servo burst in the first servo frame using the head to generate a second read signal;
- sample the second read signal to generate second signal samples;
- use a second matched filter matched to the C servo burst to filter the second signal samples to generate second filtered samples within the C burst window; and
- process the second filtered samples to generate the PES.

15. The data storage device as recited in claim 14, wherein the control circuitry is further configured to generate the C burst window based on a predetermined fraction of the estimated time ta.

16. A data storage device configured to access a magnetic media comprising a plurality of servo frames each comprising an A servo burst, a B servo burst, a C servo burst, and a D servo burst, the data storage device comprising:
- at least one head configured to access the magnetic media; and
- a means for reading the A servo burst in a first servo frame using the head to generate a first read signal;
- a means for sampling the first read signal to generate first signal samples;
- a means for using a first matched filter matched to the A servo burst to filter the first signal samples to generate first filtered samples within a first burst window;
- a means for first updating the first burst window based on the first filtered samples;
- a means for processing the first filtered samples within the first burst window to generate a position error signal (PES); and
- a means for controlling a position of the head relative to the magnetic media based on the PES.

17. The data storage device as recited in claim 16, wherein the data storage device further comprises the magnetic media, and the magnetic media includes magnetic tape.

18. The data storage device as recited in claim 16, wherein:
- the magnetic media is housed in a cartridge assembly; and
- the data storage device further comprises a tape drive assembly configured to receive the cartridge assembly.

19. The data storage device as recited in claim 16, wherein the first burst window estimates a center of the A servo burst in the first servo frame, and the data storage device further comprises:
- a means for reading the A servo burst in a second servo frame using the head to generate a second read signal;
- a means for sampling the second read signal to generate second signal samples;
- a means for using the first matched filter to filter the second signal samples to generate second filtered samples within the first updated first burst window; and
- a means for second updating the first burst window based on the second filtered samples.

20. The data storage device as recited in claim 19, further comprising:
- a means for measuring an A-A burst interval representing an estimated time ta from the center of the A servo burst in the first servo frame to a center of the A servo burst in the second servo frame; and
- a means for second updating the first burst window based on the estimated time ta.

21. The data storage device as recited in claim 20, further comprising:
- a means for generating a second burst window based on the estimated time ta;
- a means for reading the C servo burst in the first servo frame using the head to generate a third read signal;
- a means for sampling the third read signal to generate third signal samples;
- a means for using a second matched filter matched to the C servo burst to filter the third signal samples to generate third filtered samples within the second burst window; and
- a means for processing the third filtered samples to generate the PES.

22. The data storage device as recited in claim 21, further comprising a means for generating the second burst window based on a predetermined fraction of the estimated time ta.

* * * * *